Sept. 13, 1949.  G. GUANELLA  2,481,659
MEANS FOR AND METHOD OF SYNCHRONIZING
ALTERNATING ELECTRIC VOLTAGES
Filed Sept. 11, 1947  3 Sheets-Sheet 1
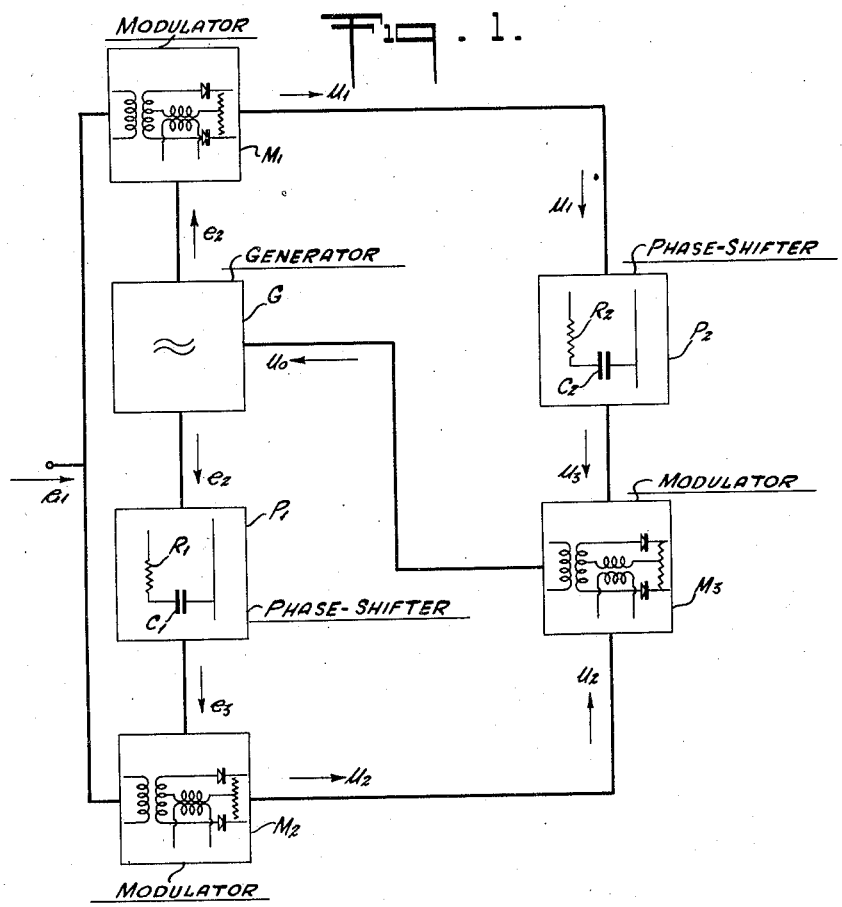
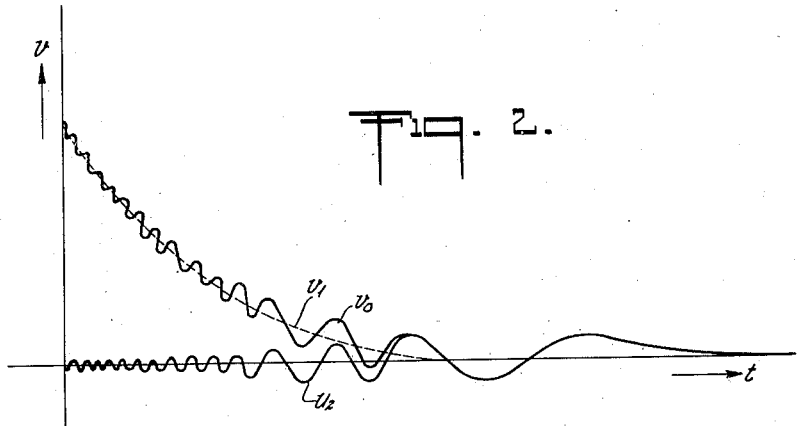
INVENTOR
GUSTAV GUANELLA
BY
ATTORNEY

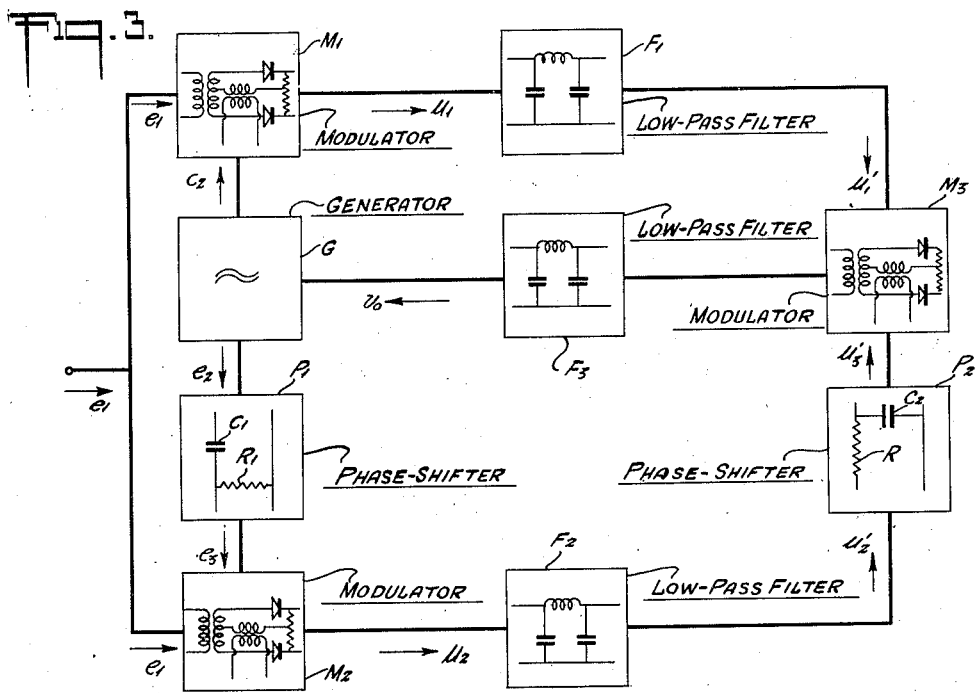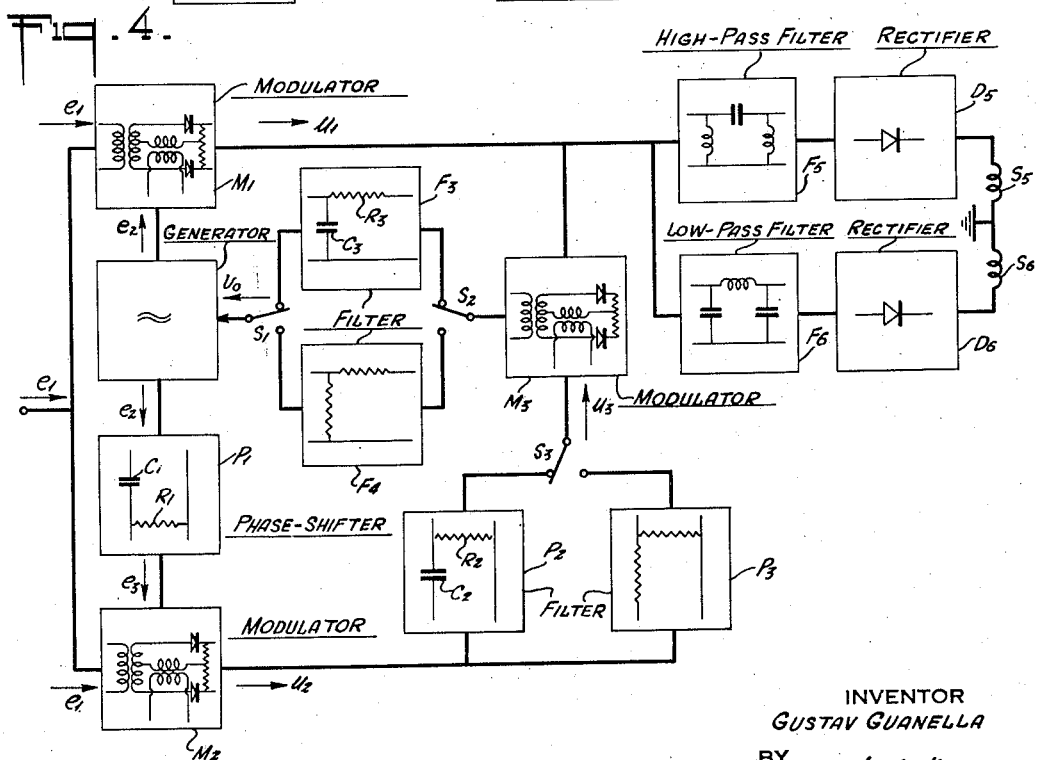

Sept. 13, 1949.   G. GUANELLA   2,481,659
MEANS FOR AND METHOD OF SYNCHRONIZING
ALTERNATING ELECTRIC VOLTAGES
Filed Sept. 11, 1947   3 Sheets-Sheet 3
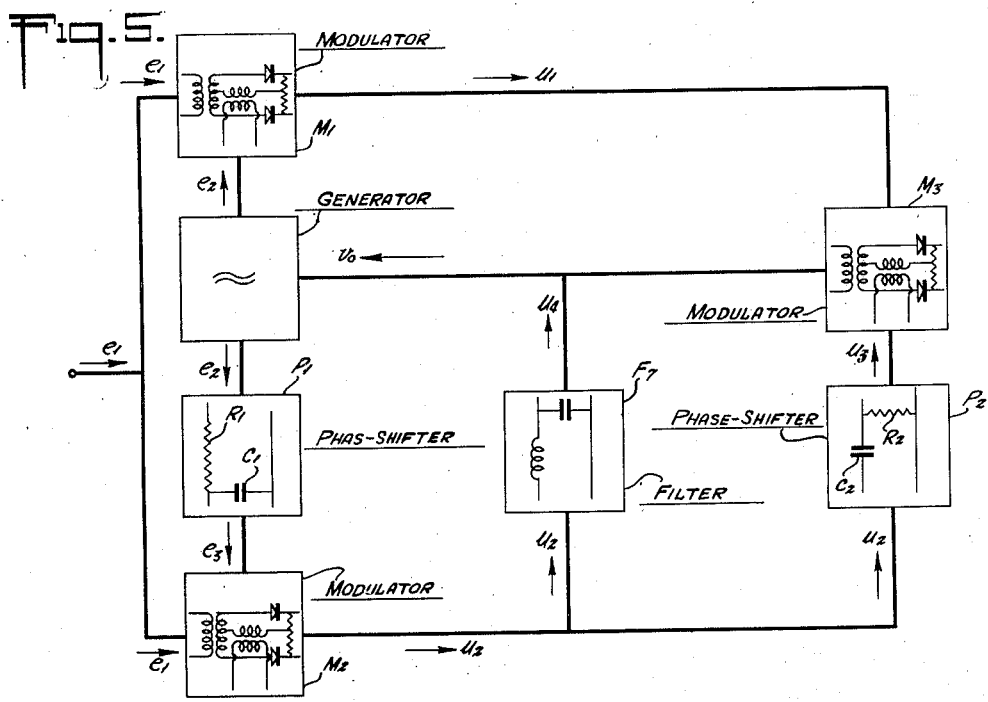
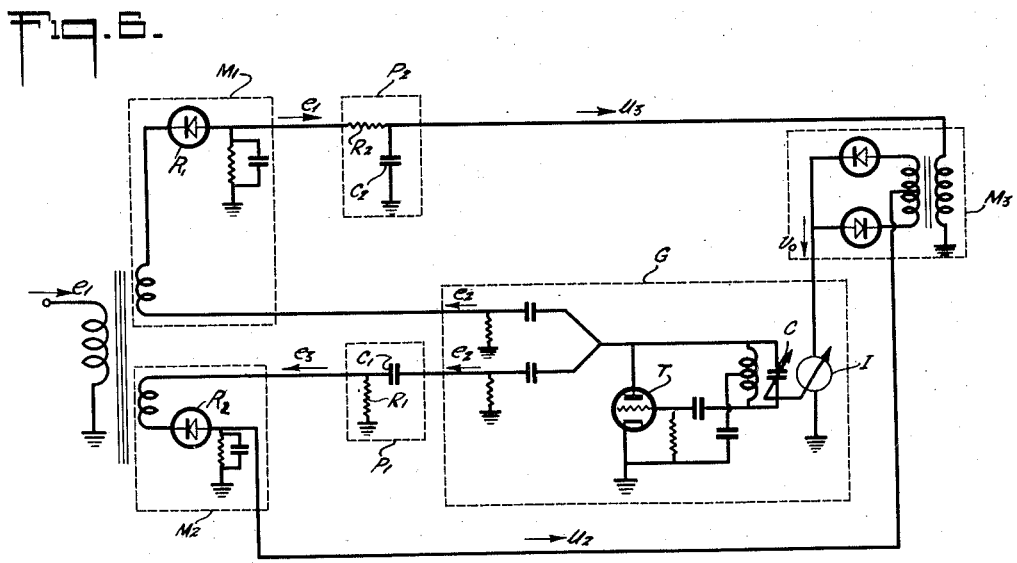
INVENTOR
GUSTAV GUANELLA
BY
ATTORNEY Patented Sept. 13, 1949

2,481,659

UNITED STATES PATENT OFFICE 2,481,659

MEANS FOR AND METHOD OF SYNCHRONIZING ALTERNATING ELECTRIC VOLTAGES

Gustav Guanella, Zurich, Switzerland, assignor to Radio Patents Corporation, New York, N. Y., a corporation of New York Application September 11, 1947, Serial No. 773,392
In Switzerland July 11, 1942

14 Claims. (Cl. 250—36)

According to known synchronizing methods, a regulating voltage is produced by comparing two alternating voltages to be synchronized, said regulating voltage varying in proportion to the relative frequency deviation of said voltages. By a frequency control of at least one of said alternating voltages to be synchronized in dependence upon said regulating voltage, the frequency deviations are automatically reduced to a minimum. Absolute synchronism is not, however, obtainable with devices of this type, since in order to form a regulating voltage, a certain permanent difference between the frequencies of the voltages to be synchronized is necessary.

Other arrangements are known, wherein a regulating voltage is produced varying according to the relative phase deviation between the two alternating voltages to be synchronized. By controlling the frequency of at least one of the alternating voltages in dependence on this regulating voltage, the relative phase deviation of said alternating voltages is kept at a minimum, provided a frequency coincidence exists between said voltages. If the frequencies of said voltages differ from each other, the regulating voltage will oscillate about zero in the rhythm of the difference frequency or remain zero if suppressed by adequate smoothing devices. Regulation is therefore possible only if both alternating voltages have the same frequency for at least a certain period of time. Furthermore, this synchronization upon a constant phase difference will be interrupted by any phase displacement of either alternating voltage.

Other synchronizing methods have become known, wherein the generator of the alternating voltage to be synchronized is directly subjected to the effect of the synchronizing voltage so that the frequencies of both alternating voltages coincide with a substantially constant phase difference. The auxiliary generators employed in television sets are generally synchronized in this manner, the voltage generated having a sawtooth shape and the synchronizing voltage being of impulse form in a manner well known. A disadvantage of devices of this type is due to the fact that synchronism is instantly disturbed or the generation of the oscillations interrupted altogether, whenever the synchronizing voltage is interrupted temporarily.

The aforementioned disadvantages are substantially overcome according to the present invention by controlling the alternating voltage which is to be synchronized by a regulating voltage or equivalent magnitude the amplitude and sign of which depends upon the frequency difference between the voltages to be synchronized to a point where said difference tends to disappear or approach zero. By this means, an original large frequency difference between the voltages to be synchronized is at first reduced to a minimum. Thereafter, due to the particular regulating voltage produced by the invention depending also on slow relative phase changes between the voltages to be synchronized, at least one of the alternating voltages is further influenced, whereby the regulation is continued to the point of reaching a constant phase difference between said voltages, whereby to result in an absolute or locked synchronism within a substantial range of phase and/or frequency deviation.

The invention will become more apparent from the following detailed description of several practical embodiments thereof taken in reference to the accompanying drawings forming part of this specification, and wherein:

Figure 1 is a schematic block diagram of a basic synchronizing system embodying the principles of the invention;

Figure 2 is a graph illustrative of the function and operation of Figure 1;

Figures 3, 4 and 5 are further block diagrams showing improvements and modifications of a synchronizing system according to Figure 1; and Figure 6 is a more complete circuit diagram of a basic synchronizing system according to the invention as shown in Figure 1.

Like reference characters identify like elements or circuits throughout the different views of the drawings.

In the arrangement shown in Figure 1, the alternating voltage $e_2$ produced by the generator G is to be synchronized with an incoming alternating voltage $e_1$. If sinusoidal voltages having angular velocities $w_1$ and $w_2$, phase angles $b_1$ and $b_2$ and amplitudes $E_1$ and $E_2$, respectively, are assumed, these may be written by the following equations:

$$e_1 = E_1 \cdot \sin(w_1 t + b_1) \quad (1)$$
$$e_2 = E_2 \cdot \sin(w_2 t + b_2) \quad (2)$$

The voltage $e_2$ has its phase rotated by 90° by a phase shifter $P_1$ to produce a phase-displaced voltage $e_3$ as follows:

$$e_3 = E_3 \cdot \cos(w_2 + b_2) \quad (3)$$

Phase shifter $P_1$ may be of any known type such as a series circuit comprising a resistance $R_1$ and a condenser $C_1$ having suitable resistive and reactive impedances and well known to those skilled in the art.

The modulating circuits or devices $M_1$ and $M_2$ which also may be of well known type such as rectifier bridge or balanced modulators as indicated in the drawings, serve to produce modulation products from the voltages $e_1$, $e_2$ and $e_1$, $e_3$, respectively. As is well known, such a modulation results in the formation of difference and sum frequencies. The latter are suppressed by the coupling circuits or by means of special filters in a manner well understood and not especially shown in the drawing. Hence, modulation products or voltages $u_1$ and $u_2$ will be obtained from the outputs of the modulators $M_1$ and $M_2$ as shown by the following equations:

$$u_1 = k_1 \cdot e_1 e_2 = \mp K_1 \cdot \cos[(\pm w_2 \mp w_1)t \pm b_2 \mp b_1] \quad (4)$$
$$u_2 = k_2 \cdot e_1 e_3 = \mp K_2 \cdot \sin[(\pm w_2 \mp w_1)t \pm b_2 \mp b_1] \quad (5)$$

wherein $k_1$, $k_2$ and $K_1$, $K_2$ are constants representing the amplitudes of the respective voltages. Since negative frequencies have no meaning, either of the upper or lower signs in the equations should be considered, depending upon whether $w_2$ is larger or smaller than $w_1$, respectively.

Item $P_2$ represents a further phase shifting circuit which is so designed that all the frequencies of voltage $u_1$ above a given minimum frequency are rotated by at least 90°, while the phase rotation for smaller frequencies is less and such as to approach zero for zero frequency. This effect is obtained by the circuit indicated comprising a series resistance $R_2$ and a parallel condenser $C_2$, resulting in a phase rotation $\alpha$ as follows:

$$tg\alpha = wRC$$

or $$\alpha = arctg\ wRC = arctg\ (\pm w_2 \mp w_1)RC \quad (6)$$

Thus, from $u_1$ the phase-displaced voltage $u_3$ is obtained as follows:

$$u_3 = \mp K_1 \cos[(\pm w_2 \mp w_1)t \pm b_2 \mp b_1 - \alpha] \quad (7)$$

In the further modulating circuit $M_3$, a control or regulating voltage $v_0$ is produced by combining $u_3$ and $u_2$ which control voltage depends on the mutual phase position of $u_2$ and $u_3$ and is expressed as follows:

$$v_0 = K_4.u_2.u_3 = \mp K_4.\sin\alpha$$
$$\mp K_4.\sin[2(\pm w_2 \mp w_1)t \pm 2(b_2 - b_1) - \alpha]$$
$$= v_1 + v_2 \quad (8)$$

With large frequency differences $(w_2-w_1)$ between the voltages $e_1$ and $e_2$, the component $v_2$ whose frequency is $\pm(w_2-w_1)$, is suppressed by the elements of the circuit which do not allow the higher frequencies to pass or if necessary by the provision of special low pass filters (not shown), so that only the direct current component $v_1$ remains as follows:

$$v_0 = v_1 = \mp K_4.\sin\alpha \quad (9)$$

$\alpha$ being defined by Equation (6) and depending on the frequency deviation $(\pm w_2 \mp w_1)$ between the voltages to be synchronized, with the upper sign applying to a positive frequency difference $(w_2-w_1)$ and the lower sign applying to the negative frequency difference $(w_2-w_1)$. This direct current component thus is proportional to the frequency deviation $(w_2-w_1)$ as to direction or sign and serves as a frequency control voltage for the generator G in the manner schematically indicated to reduce the generator frequency deviation relative to the frequency of the incoming voltage $e_1$ to a minimum.

As soon as the frequencies $w_2$ and $w_1$ coincide with each other, the first component $v_1$ of $v_0$ disappears according to Equations 6 and 8 and the second component $v_2$ then becomes a direct current voltage as follows:

$$v_0 = v_2 = \mp K_4.\sin[2(b_2 - b_1)] \quad (10)$$

Accordingly, this new regulating voltage corresponds to small phase differences $(b_2-b_1)$ both as to sign and magnitude between the voltages $e_2$ and $e_1$ to be synchonized. By controlling the generator G by this regulating voltage, a temporary small frequency change of $e_2$ is effected, resulting in a change of the phase angle $b_2$ until reaching the limit value of the phase difference $(b_2-b_1)$ which in the present case is assumed to be approximately zero.

The combined regulating process follows a course shown in Figure 2 which shows a plot of the control voltage as a function of time $t$ and wherein the angular velocity $w_2$ has been assumed to be too large at the beginning of the regulating process compared with the angular velocity $w_1$. Hence, the regulating voltage $v_0$ will be negative according to Equation 9 so as to cause a frequency reduction of the generator G. As the frequency deviation decreases, the frequency-responsive component $v_1$ of the regulating voltage $v_0$ also decreases. At the same time, the phase-responsive component $v_2$ becomes increasingly effective as the oscillation frequency is decreased. The frequencies can finally be considered to coincide as soon as the phase angle $b_2$ of $e_2$ begins to vary, or in other words, Equation 10 comes into effect. Consequently generator G, assuming the phase difference $(b_2-b_1)$ to be positive, will be influenced by the regulating voltage $v_2$ which during this period is negative in such a manner that the phase difference will change only slightly and finally assume a constant value. Absolute phase synchronism between the voltages $e_1$ and $e_2$ both as to correct frequency and phase is thus obtained in a most efficient and fully automatic manner.

It will be evident that the phase shifting circuit $P_1$ in Figure 1 may also be located between the generator G and the modulator $M_1$ or that separate phase shifting circuits may be provided between the generator G and $M_1$ on the one hand, and between the generator G and $M_2$ on the other hand, producing a final relative phase shift of 90° between the voltages $u_1$ and $u_2$. Alternatively, the phase shifting circuits may be inserted in the transmission path of the incoming voltage $e_1$ to the modulator $M_1$ and/or $M_2$. In the same manner it is possible for the phase shifting circuit $P_2$ to be placed in the path of the voltage $u_2$ or to be replaced by two phase shifting circuits producing phase rotations differing by 90° and inserted in the paths of $u_1$ and $u_2$, respectively.

In an arrangement of the type described, the voltages $u_1$ and $u_2$ may be regarded as forming a rotating electric field having a direction of rotation which depends on the sign of the frequency deviation $(w_2-w_1)$. When $e_1$ and $e_2$ have the same frequency this field ceases to rotate and becomes a stationary field vector the direction or position of which indicates the phase difference bteween $e_1$ and $e_2$. The devices $P_2$ and $M_3$ then serve to produce the regulating voltage which depends on the direction of rotation and thus on the frequency deviation. There are other arrangements known for producing a regulating voltage depending on a rotating field vector suitable for synchronizing purposes, such as the arrangements shown in Figures 3, 4 and 5 of British Patent No. 441,793. As is understood, such arrangements may also be used in place of the modulator $M_3$ for the purposes of the present invention.

The novel effects obtained by the invention compared with known synchronizing methods are due to the fact that the regulating voltage or equivalent magnitude does not disappear when the voltages $e_1$ and $e_2$ which are to be synchronized have attained the same frequency, but assumes a value varying in proportion to the phase difference between said voltages. For this purpose, the transmission paths for the voltages $u_1$ and $u_2$ must be designed to allow the passage of direct current in contrast to similar arrangements known in the prior art. As soon as the rotating field vector of the voltages $u_1$ and $u_2$ has become stationary or their frequencies equalized, the regulating voltage will assume a value which depends on the direction of this vector or the instantaneous phase difference between the voltages $e_1$ and $e_2$, whereby to enable an automatic regulation to a definite phase difference or absolute synchronism between said voltages.

In many cases it is desirable that a frequency control of the generator G should be effective only if the frequency difference $(w_2-w_1)$ between $e_1$ and $e_2$ remains within a minimum or limit frequency $w_0$. For this purpose there are provided in Figure 3 a pair of low-pass filters $F_1$ and $F_2$ inserted in the paths of the voltages $u_1$ and $u_2$, respectively, by means of which the latter will be transmitted only if their frequency $(w_2-w_1)$ is less than the filter limiting frequency $w_0$. These filters should be designed to be exactly alike as far as possible so that no additional phase difference will be introduced between the voltages $u_1$ and $u_2$. In this manner, undesirable effects on the frequency control due to disturbing components of $e_1$ or $e_2$ are avoided, whenever the frequency $(w_2-w_1)$ is larger than the limiting frequency $w_0$.

The regulating operation may furthermore be influenced by the insertion of a special electrical network $F_3$ in the transmisison path of the regulating voltage $v_0$. If network $F_3$ is a smoothing device or low-pass filter as shown having a very low limiting frequency, only the slowly varying components of $v_0$ will be transmitted together with the direct current components, and control the synchronism of the generator G. The amplitude and phase transmission characteristic of the network $F_3$ may be determined in a known manner or by trial so as to obtain as rapid a frequency control as possible compatible with the requirement to avoid oscillations or hunting of the system.

According to the improved arrangement shown in Figure 4, phase shifting circuits and filters are provided which are connected and disconnected in dependence upon the magnitude of the absolute value of the relative frequency deviation $(w_2-w_1)$. Thus, in Figure 4, the phase rotation effected by $P_2$ amounts to 90° and that of $P_3$ to approximately 0° or 180°. In this case, with large frequency deviations $(w_2-w_1)$, $P_2$ is connected in the path of $u_3$ by a switch $s_3$ as shown so that, on account of $\alpha=\pi/2$, a regulating voltage $v_0=v_1=\mp K_4.\sin \alpha$ is formed according to Equation 9 whose sign depends on the sign of the frequency deviation $(w_2-w_1)$. On the other hand, with very small frequency deviations $(w_2-w_1)$, the phase rotating circuits are changed over to $P_3$ by means of $s_3$. Due to $\alpha=0$, the components $v_1$ of $v_0$ in this case will be zero, leaving the component $v_2$ according to Equation 10 to adjust the synchronism between $e_1$ and $e_2$ to the proper phase difference.

Furthermore, the connection of circuit $F_3$ during a period of large frequency difference, will result in the regulation at first being independent of the rapidly changing components of $v_2$ until a minimum frequency difference $(w_2-w_1)$ is reached. Thereupon, switching over to $F_4$ by means of switches $s_1$ and $s_2$ will result in a component $v_2$ which in the beginning is still changeable to be weakened and to be transmitted without delay, whereby to enable a rapid control of the generator and to insure a correct phase adjustment between the synchronized voltages.

In order to effect an automatic operation of the change-over switches, the voltage $u_1$ is shown passed in parallel through a high-pass and a low-pass filter $F_5$ or $F_6$ having coinciding lower and upper limiting frequencies and rectifiers $D_5$, $D_6$ to the excitation windings $S_5$ or $S_6$ of a relay serving to operate the switching contacts $s_1$, $s_2$, $s_3$, respectively. The change-over then occurs at the instant when the frequency deviation $(w_2-w_1)$ equals the limiting frequencies of filters $F_5$ and $F_6$.

In an arrangement shown in Figure 1, a stable minimum for the regulating voltage component $v_2$ according to Equation 1 is possible, both for $(b_2-b_1)=0°$ and $(b_2-b_1)=180°$. Hence, regulation may occur for an equal or opposite phase position between the voltages $e_1$ and $e_2$ to be synchronized. Even if $(b_2-b_1)=\pm90°$, the regulating voltage will be zero. This value, however, is not stable, since any small deviation from this phase difference will result in a regulating voltage acting on the generator frequency in the sense of an increase of the deviation until reaching any of the aforementioned stationary conditions. If the phase shifting circuits are adjusted differently, the phase differences in the stationary condition may have other values. The arrangement shown in Figure 3, for instance, may result in a stable minimum for the regulating magnitude with $(b_2-b_1)=\pm90°$.

In many cases, it is desired that there should be only one stable minimum of the regulating voltage for $(b_2-b_1)=0°$ or with the voltages $e_1$ and $e_2$ maintained in exact phase coincidence by the synchronizing process. This result may be achieved by means of a modified arrangement shown in Figure 5. In the latter, the phase shifting circuit $P_2$ is again designed to produce a phase rotation of 90°. The amplitude transmission of this circuit is, however, zero when the frequency tends towards zero. This is for instance the case with the series connection of a condenser $C_2$ and the resistance $R_2$ as shown. The voltage $u_2$ is furthermore passed through a low pass filter $F_7$ directly to the regulating circuit of the generator G, i. e. by-passing both the circuits $P_2$ and $M_3$, so that the regulating voltage $v_0$ is composed of the only slightly changing components of $u_2$ and the modulation product obtained from $u_1$ and $u_3$ in the modulator $M_3$. If the frequency difference $(w_2-w_1)$ between $e_2$ and $e_1$ is large, there is no transmission over the filter $F_7$ due to the frequency being too high. Under this condition the Equation 8 applies to the modulation product and the regulating voltage $v_0$ according to Equation 9 again corresponds to the sign of the frequency deviation, so that this deviation is reduced by the automatic regulation. When the frequency difference decreases, the frequency of $u_2$ and therefore the amplitude of $u_3$ also decreases, so that the modulation product $k_4 \cdot u_1 \cdot u_2$ finally disappears. Only the slowly changing voltage $u_4$ is thus transmitted over $F_4$, and the regulating voltage will be as follows:

$$v_0 = v_2 = u_2 = -K_2 \sin(b_2 - b_1) \quad (11)$$

A stationary minimum of this regulating voltage occurs only when $(b_2 - b_1) = 0°$, because small deviations compared with a phase difference $(b_2 - b_1) = 180°$ which may occur accidentally always result in an increase in these deviations until reaching the stationary phase difference $(b_2 - b_1) = 0°$.

The generator G may be influenced by the regulating voltage $v_0$ in any known manner such as by a regulating voltage directly controlling a voltage responsive tuning element such as an electronic reactance control tube or a premagnetized inductance coil, or by using mechanical tuning means actuated by electromechanical control means as shown in Figure 6. Furthermore, if G is a mechanically driven generator, the speed of the driving machine may be directly or indirectly controlled by the regulating voltage $v_0$. This can for instance be achieved by varying the excitation of a driving motor or by speed regulation, if necessary in connection with amplifiers and relays.

Referring to Figure 6, there is shown by way of example a more complete circuit diagram of a basic system according to Figure 1, employing well known and conventional elements and circuits for carrying out the invention. Thus, the modulators $M_1$ and $M_2$ are shown in the form of simple rectifiers $R_1$ and $R_2$ of any known type connected in series with the sources supplying the respective voltages $e_1$, $e_2$ and $e_1$, $e_3$ to be combined for producing product or difference frequency voltages $u_1$ and $u_2$. The latter are derived from suitable rectifier load resistors, in a manner well known and understood. The generator G to be synchronized with the incoming voltage $e_1$ is shown in the form of a standard regenerative feedback type electron tube oscillator comprising an oscillating three-electrode tube T and an oscillatory or tank circuit, the resonant frequency of which determines the oscillating frequency in a manner well known. The oscillating frequency is controlled by the electric control current or voltage $v_0$ by the aid of a current-responsive instrument or the like I mechanically coupled with an adjustable electrode of the tank circuit condenser C, in the manner shown and understood.

The components of the oscillating voltage $e_2$ are applied to the rectifier or modulating circuits by way of suitable coupling networks such as standard resistance coupling circuits as shown in the drawing, the phase shift network $P_1$ in the path of one of said components serving to produce a relative quadrature phase shift between the difference frequency voltages $u_1$ and $u_2$. The components of the incoming or synchronized voltage $e_1$ are applied to the modulating or rectifier circuits through a pair of secondary windings of a coupling transformer, as shown in the drawing. The quadrature phase shifting network $P_1$ comprising a condenser $C_1$ in series with a resistor $R_1$ is designed to offer a relatively high capacitative impedance by the condenser $C_1$ compared with the resistive impedance of the resistor $R_1$, in which case the current through and, in turn, the voltage $e_3$ across resistance $P_4$ will be rotated or shifted by 90° relative to the voltage $e_2$ in a manner well known and readily understood. The phase shifting circuit $P_2$ connected to the output of the modulator $M_2$ is so designed as to produce a frequency-dependent output voltage $u_3$, i. e. with the phase of $u_3$ increasing substantially linearly from zero to 90° as the frequency varies from zero to a predetermined minimum frequency or frequency deviation range between the voltages $e_1$ and $e_2$, in the manner explained hereinabove. The difference frequency voltages $u_2$ and $u_3$ are in turn intermodulated in the modulator $M_3$ shown in the form of a double-wave rectifier circuit to produce a final frequency regulating voltage $v_0$ for controlling the generated or oscillator frequency, in the manner described hereinabove.

The intermodulation of the intermediate frequency voltages $u_2$ and $u_3$ may be effected by means of any known device or circuit arrangement capable of producing output energy either electrical or mechanical which varies according to a product function of the input voltages such as a modulating circuit or network, as shown in the drawings and capable of producing a varying output current utilized for controlling the frequency of one of the alternating voltages to be synchronized. Alternatively, a mechanical product forming device such as a dynamometer or wattmeter instrument may be employed excited by the voltages $u_2$ and $u_3$, in which case the output appears in the form of a rotary movement or torque which may be used to control the generator frequency such as by operating a suitable frequency control device such as a variable condenser or the like, such as shown in Figure 6.

While there have been described a few desirable embodiments of the invention, it is understood that various changes and modifications in the circuits and arrangements shown, as well as the substitution of equivalent parts and circuit elements for those shown may be made without departing from the scope and spirit of the invention as defined by the appended claims. The specification and drawings are accordingly to be regarded in an illustrative rather than a limiting sense.

I claim:

1. The combination with an alternating voltage generator provided with means to control the frequency thereof in accordance with a control voltage, of means for producing a frequency control voltage for said generator to maintain said generator in exact synchronism with a periodic synchronizing voltage, comprising phase shifting and modulating means for producing a pair of quadrature difference frequency voltages from the generated and synchronizing voltages, further means to vary the phase of one of said quadrature voltages between zero and 90° substantially linearly as the frequency thereof changes from zero to a predetermined value, means for intermodulating said last mentioned difference frequency voltage with the other difference frequency voltage, and means for deriving a frequency control voltage from the output of said last means.

2. The combination with an alternating voltage generator provided with means to control the frequency thereof in accordance with a control voltage, of means for producing a frequency control voltage for said generator to maintain said generator in exact synchronism with an alternating synchronizing voltage comprising phase shifting and modulating means for producing a pair of quadrature difference frequency voltages from the generated and synchronizing voltages, further means for continuously varying the phase of one of said quadrature voltages between zero and 90° substantially linearly as the frequency thereof changes from zero to a predetermined value, means for intermodulating said last mentioned difference frequency voltage with the other dicerence frequency voltage, and means for deriving a frequency control voltage from the output of said last means.

3. The combination with an alternating voltage generator provided with means to control the frequency thereof in accordance with a control voltage, of means for producing a frequency control voltage for said generator to maintain said generator in exact synchronism with an alternating synchronizing voltage comprising phase shifting and modulating means for producing a pair of quadrature difference frequency voltages from the generated and synchronizing voltages, means for intermodulating said difference frequency voltages to produce a frequency control voltage for said generator, means for deriving a frequency control voltage from said last means, and a phase shifting network comprising a series resistance and a parallel capacitance to produce a phase shift of one of said quadrature voltages varying substantially linearly from zero to 90° within a predetermined difference frequency change from zero to a given maximum.

4. The combination with an alternating voltage generator provided with means to control the frequency thereof in accordance with a control voltage, of means for producing a frequency control voltage for said generator to maintain said generator in exact synchronism with an alternating synchronizing voltage comprising phase shifting and modulating means for producing a pair of quadrature difference frequency voltages from said generator and said synchronizing voltages, further means to vary the phase of one of said quadrature voltages substantially linearly between zero and 90° as the frequency thereof changes from zero to a predetermined value, means for intermodulating said last mentioned difference frequency voltage with the other difference frequency voltage to produce a frequency control voltage for the generator, and a pair of low pass filters having equal predetermined cut-off frequencies and each inserted in the path of one of said quadrature voltages.

5. The combination with an alternating voltage generator provided with means to control the frequency thereof in accordance with a control voltage, of means for producing a frequency control voltage for said generator to maintain said generator in exact synchronism with an alternating synchronizing voltage comprising phase shifting and modulating means for producing a pair of quadrature difference frequency voltages from the generated and synchronizing voltages, further means to vary the phase of one of said quadrature voltages substantially linearly between zero and 90° as the frequency thereof changes from zero to a predetermined value, means for intermodulating said last mentioned difference frequency voltage with the other difference frequency voltage to produce a frequency control voltage for the generator, and a low pass filter having a predetermined cut-off frequency inserted in the path of said control voltage.

6. The combination with an alternating voltage generator provided with means to control the frequency thereof in accordance with a control voltage, of means for producing a frequency control voltage for said generator for maintaining said generator in exact synchronism with an alternating synchronizing voltage comprising a pair of first modulators each being excited by the generated voltage and said synchronizing voltage to produce a pair of difference frequency voltages, means for producing a first substantially constant phase shift between said difference frequency voltages, further means for producing an additional relative phase shift between said difference frequency voltages varying substantially linearly in proportion to the difference frequency between zero and a predetermined limit frequency, and a further modulator for combining the phase shifted difference frequencies to produce a frequency control voltage for said generator.

7. The combination with an alternating voltage generator provided with means to control the frequency thereof in accordance with a control voltage, of means for producing a frequency control voltage for said generator for maintaining said generator in exact synchronism with an alternating synchronizing voltage comprising a pair of first modulators each being excited by the generated voltage and said synchronizing voltage to produce a pair of difference frequency voltages, means for producing a first substantially constant phase shift between said difference frequency voltages, further means for producing an additional relative phase shift between said difference frequency voltages varying continuously and substantially linearly in direct proportion to the difference frequency increases from zero to a predetermined value, and a further modulator for combining the phase shifted difference frequencies to produce a frequency control voltage for said generator.

8. The combination with an alternating voltage generator provided with means to control the frequency thereof in accordance with a control voltage, of means for producing a frequency control voltage for said generator for maintaining said generator in exact synchronism with an alternating synchronizing voltage comprising a pair of first modulators each being excited by said generator voltage and said synchronizing voltage to porduce a pair of difference frequency voltages, means for producing a first substantially constant relative 90° phase shift between said difference frequency voltages, further means for producing an additional relative phase shift between said difference frequency voltages varying continuously and substantially linearly between zero and 90° as the difference frequency increases from zero to a predetermined value, and a further modulator for combining the phase shifted difference frequencies to produce a frequency control voltage for said generator.

9. The combination with an alternating voltage generator provided with means to control the frequency thereof in accordance with a control voltage, of means for producing a frequency control voltage for said generator for maintaining said generator in exact synchronism with an alternating synchronizing voltage comprising a pair of first modulators each being excited by said generator voltage and said synchronizing voltage to produce a pair of difference frequency voltages, means for producing a first substantially constant phase shift between said difference frequency voltages, further means to change the relative phase of said difference frequencies substantially linearly from zero to a predetermined value as the difference frequency increases beyond and decreases below, respectively, a predetermined limit frequency, and means for intermodulating the phase shifted difference frequency voltages to produce a frequency control voltage for said generator.

10. In a system for maintaining the frequencies of two energy sources in exact synchronism, the method of producing a frequency control voltage for controlling the frequency of one of said sources to restore and maintain the synchronism thereof which comprises producing from said frequencies a pair of difference frequencies having a predetermined constant phase relation, additionally varying the relative phase of said difference frequencies substantially linearly and in proportion to the frequency thereof, intermodulating the phase shifted difference frequencies and utilizing the average modulation product to derive a frequency control voltage.

11. In a system for maintaining the frequencies of two energy sources in exact synchronism, the method of producing a frequency control voltage for controlling the frequency of one of said sources to restore and maintain the synchronism thereof which comprises producing from said frequencies a pair of quadrature difference frequencies, additionally varying the relative phase of said difference frequencies in direct proportion to the frequency thereof, intermodulating the phase shifted difference frequencies and utilizing the average modulation product to derive a frequency control voltage.

12. The combination with a pair of oscillatory energy sources at least one of which has a frequency variable in accordance with a control voltage, means for producing a frequency control voltage for restoring and maintaining the synchronism between said sources comprising means for deriving from said sources a pair of difference frequency voltages having a predetermined constant phase relation, further means for additionally varying the relative phase of said difference frequency voltages in direct proportion to the frequency thereof, means for intermodulating the phase shifted difference frequency voltages, and further means for utilizing the modulation product to derive a frequency control voltage.

13. The combination with a pair of oscillatory energy sources at least one of which has a frequency variable in accordance with a control voltage, means for producing a frequency control voltage for restoring and maintaining the synchronism between said sources comprising means for deriving from said sources a pair of quadrature difference frequency voltages, means for additionally varying the relative phase of said difference frequency voltages in direct proportion to the frequency thereof, means for intermodulating the phase shifted difference frequency voltages, and further means for utilizing the average modulation product to derive a frequency control voltage.

14. In combination with an alternating voltage generator having control means for varying the frequency thereof in accordance with a control voltage, of means for producing a frequency control voltage for said generator for maintaining said generator in synchronism with an alternating synchronizing voltage comprising phase-shifting and modulating means for producing first and second quadrature difference frequency voltages from the generated and synchronizing voltages, further means for additionally varying the phase of said first quadrature difference frequency voltage substantially linearly between zero and 90° as the frequency thereof changes from zero to a predetermined limit value, means for intermodulating the phase-shifted first quadrature voltage with said second quadrature voltage to produce a direct current control voltage, means for applying said control voltage to said control means to restore and maintain the synchronism of said generator with said synchronizing frequency, and means including low-pass filter means for directly applying said first quadrature voltage to said control means to additionally control the generated frequency within a predetermined minimum deviation range thereof from said synchronizing frequency.

GUSTAV GUANELLA.

REFERENCES CITED

The following references are of record in the file of this patent:

UNITED STATES PATENTS

| Number | Name | Date |
|---|---|---|
| 2,239,436 | Alexanderson | Apr. 22, 1941 |
| 2,419,637 | Gabriel et al. | Apr. 29, 1947 |